United States Patent [19]

Blatt

[11] Patent Number: 4,496,138

[45] Date of Patent: Jan. 29, 1985

[54] POWER OPERATED CLAMP

[76] Inventor: Leland F. Blatt, 31915 Groesbeck Hwy., Fraser, Mich. 48026

[21] Appl. No.: 362,512

[22] Filed: Mar. 26, 1982

[51] Int. Cl.[3] .................................... B23Q 3/08

[52] U.S. Cl. .................................... 269/32; 269/93; 269/94; 269/233

[58] Field of Search .................... 269/91, 93, 94, 27, 269/31, 32, 35, 233

[56] References Cited

U.S. PATENT DOCUMENTS

| | | | |
|---|---|---|---|
| 3,570,835 | 3/1971 | McPherson | 269/32 |
| 3,618,931 | 11/1971 | Blatt | 269/32 |
| 4,021,027 | 5/1977 | Blatt | 269/32 |
| 4,396,183 | 8/1983 | Lymburner | 269/32 |

*Primary Examiner*—Robert C. Watson

*Attorney, Agent, or Firm*—Cullen, Sloman, Cantor, Grauer, Scott & Rutherford

[57] ABSTRACT

A power operated clamp includes a cylinder having a reciprocal piston rod. A hollow body is aligned with and connected to the cylinder and mounted upon a support. The body includes a pair of spaced side plates at their one ends secured to the cylinder. The piston rod extends into the body. A clamp arm is pivotally mounted upon the body and in one position is adapted to retainingly engage a workpiece relative to a workpiece support. A linkage is pivotally connected to the clamp arm; the improvement which comprises a series of vertically spaced pairs of longitudinally spaced transverse mount holes extending through the side plates. The mounting of the body includes an upright riser extending between the side plates and has a series of longitudinal similarly spaced apertures corresponding to some of the side plate apertures. Pivot bolts extend through some of the side plate apertures and riser, whereby the body may be mounted in one of a plurality of longitudinal locations relative to the riser. The side plates upon their interiors have a pair of opposed guide slots. An elongated rod end within the body is axially connected to the piston rod. A pair of longitudinally spaced front and rear pivot slide pins supportably extend transversely through the rod end and at their ends are slidably mounted within the side plate slots. The linkage includes a pair of links interconnecting the rod end and clamp arm. An apertured protrusion block extends from and transversely of the rod end between the side plates and outwardly thereof. A pre-stop spans and is secured to the side plates and is spaced from and aligned with the clamp arm, is adapted for retaining engagement with the clamp arm when moved to workpiece retaining position. The linkage may be in the form of a cantilever connected to a clamp arm support and to one or more supplemental clamp arms for controlling their movements relative to a workpiece.

11 Claims, 5 Drawing Figures

POWER OPERATED CLAMP

BACKGROUND OF THE INVENTION

Heretofore a power operated clamp includes a body having a pair of side plates between which is slidably mounted a rod end connected to the reciprocal piston rod of a cylinder aligned with and attached to the body. Said clamp includes a linkage interconnecting the reciprocal rod end with a clamp arm pivotally mounted upon the body and in one position adapted for securing a workpiece with respect to a workpiece support.

THE PRIOR ART

Clamps of this type are shown in Applicant's U.S. Pat. No. 3,702,185 dated Nov. 7, 1972 entitled Cylinder Operated Power Clamp and U.S. Pat. No. 4,021,027 dated May 3, 1977 entitled Power Wedge Clamp with Guided Arm.

SUMMARY OF THE INVENTION

It is an important feature of the present invention to provide an improvement for a fluid power operated clamp of this type wherein the side plates have formed therein a series of vertically spaced pairs of longitudinally spaced mounting holes which extend through the side plates adjacent their tops and bottoms. The body may be longitudinally and adjustably mounted with respect to a riser by selectively extending a series of pivot bolts through some of the spaced mounting holes in the side plates and through corresponding apertures within a riser projected down into the body between the side plates.

A further feature incorporates into the rod end forming a part thereof a protrusion block which extends from and transversely of the rod end between the side plates and outwardly thereof, and wherein the protrusion block mounts a stop button. A prestop block spans the side plates and is welded thereto. Said pre-stop is aligned with the clamp arm and adapted for retaining engagement with the clamp arm when it is moved to a workpiece retaining position.

A further feature includes an improved clamp arm assembly and linkage which interconnects the clamp arm with the body and with the reciprocal rod end in such manner as to accomplish a controlled pivot movement of the clamp arm relative to the body or a plurality of angularly related clamp arms for movement in unison with respect to a workpiece.

A further feature of the present invention is to provide in conjunction with the rod end and the protrusion block, an improved cantilever type of extension linkage interconnected between the rod end and clamp arm, or a plurality of clamp arms for accomplishing, on movement of the rod end in one direction, pivotal clamping action of a plurality of workpiece retaining clamp arms.

These and other objects and features will be seen from the following Specification and claims in conjunction with the appended drawings.

THE DRAWINGS

It will be understood that the above drawings illustrate merely preferred embodiments of the invention, for illustration, and that other embodiments are contemplated within the scope of the claims hereafter set forth.

DETAILED DESCRIPTION OF AN EMBODIMENT OF THE INVENTION

Figure 3:
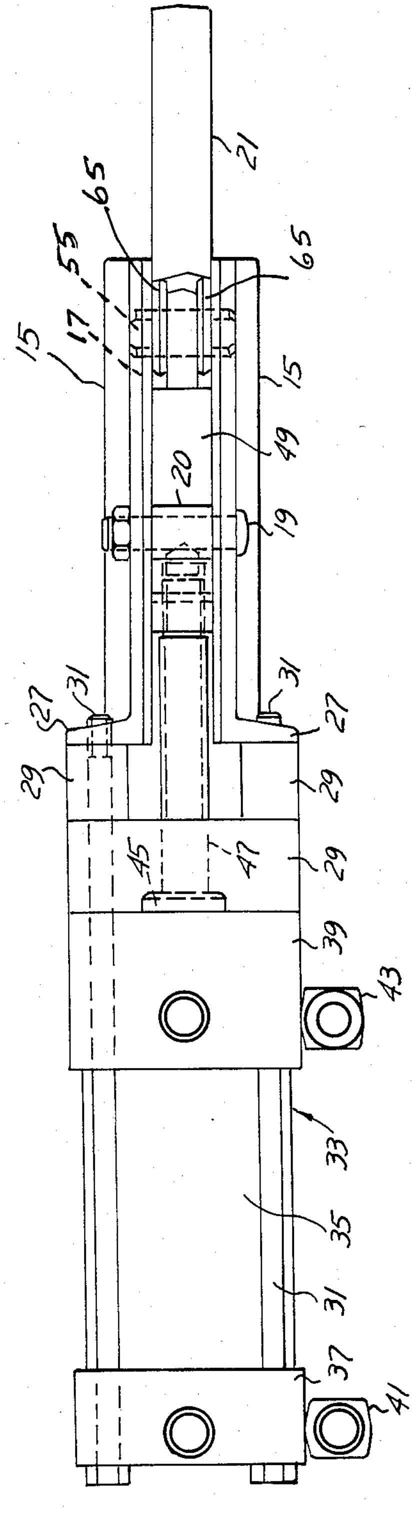
FIG. 3 is a plan view thereof.
Figure 1:
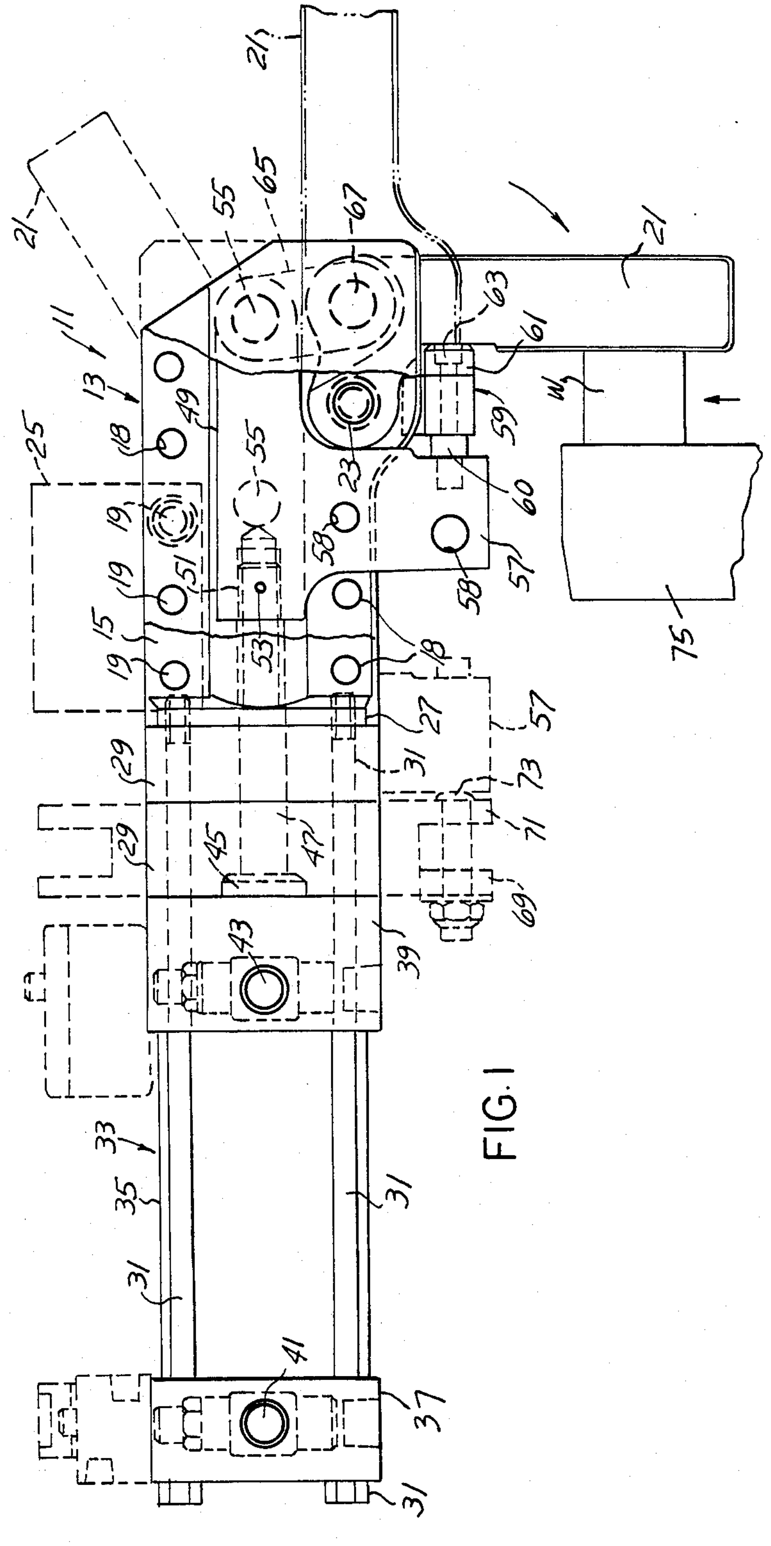
FIG. 1 is a fragmentary side elevational view of the present fluid power operated clamp with the clamp arm shown in a workpiece retaining position and with its retracted position shown in dash lines.
Figure 2:
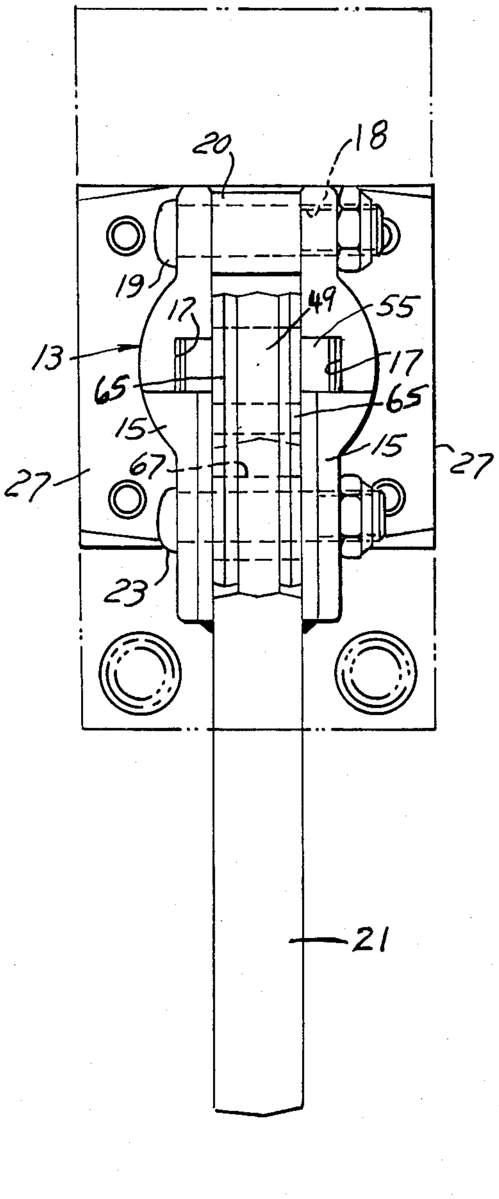
FIG. 2 is a right side elevational view thereof.

Referring to the drawing and particularly FIGS. 1, 2 and 3 the present power wedge clamp is generally indicated at 11, having a body 13 which includes a pair of opposed parallel spaced side plates 15 which have upon their interior a pair of opposed elongated slots 17, FIG. 2.

Formed within the side plates adjacent their top and bottom are a series of vertically spaced pairs of longitudinally spaced transverse mounting holes 18 which extend through the side plates and are adapted to receive transverse pivot bolts 19 which extend through the side plates and through corresponding mount holes within a plurality of body spacers 20, FIGS. 2 and 3.

Clamp arm 21, which is right angular in form, but which could be straight, is at one end pivotally mounted upon the body by the transverse pivot bolt 23 which extends through corresponding apertures 18 within the side plates.

The body is supported by riser block 25 arranged above the body having a series of longitudinally spaced apertures corresponding to the mounting holes 18 within the side plates. Said riser is selectively positioned between the side plates in one of several longitudinal positions and secured thereto by the transverse pivot bolts 19.

In the present improved clamp body 13 there is provided 8 or 9 mounting apertures 18 instead of a single mounting base such as shown at 25 in Applicant's U.S. Pat. No. 4,021,027. This adds to the versatility of the mounting, since the clamp base may be mounted not only in a forward position, but also in steps of equal increments. Since normally three holes are used for mounting, this would allow four locations for the six equally spaced mounting holes.

The side plates 15 at their one ends terminate in the outturned mount flanges 27, FIG. 2 which are apertured. These flanges bear against the spacer 29, or a pair of spacers which are axially mounted upon the end of the cylinder assembly 33 and secured thereto by the cylinder assembly bolts 31.

The cylinder assembly includes cylinder 35, an air cylinder, including blind end head 37 and rod end head 39 with corresponding ports 41 and 43 adapted to selectively and alternately receive pressure fluid such as compressed air for effecting reciprocation of a piston within said cylinder, and the piston rod 47 axially connected thereto.

Said piston rod extends outwardly of the cylinder through head 39 and the gland 45 and extends into the clamp body 13 between the side walls 15. Said rod is axially connected to the elongated rod end 49 as by the threading at 51 and by the transverse pin 53. Accordingly, the rod end is adapted for reciprocal movements within the body 13 upon which it is guidably mounted.

A pair of longitudinally spaced pivot slide pins 55, sometimes referred to as rear and front slide pins, extend transversely through rod end 49 with their outer ends slidably positioned and movably mounted within the side wall interior slots 17, FIGS. 1 and 2.

As an improvement over the earlier mentioned United States patents of the inventor there is connected to the rod end 49 as a part thereof the transverse protrusion block 57 which has apertures 58 therethrough and stop 60.

Pre-stop 59 extends between and is secured to side plates 15 and includes a rest button jig 61 and projected therethrough is an adjusting screw 63. The adjusting screw 63 and rest button 61 are generally aligned with the clamp arm 21 rearwardly thereof and in the clamping position of the clamp arm 21, FIG. 1 with respect to the workpiece W and workpiece support 75, the clamp arm 21 is in cooperative registry with the pre-stop button and screw 61, 63 for limiting pivotal clamping movements of arm 21.

Should a workpiece W be of a different dimension or width, the button 61 and adjusting screw 63 may be longitudinally adjusted to the correct location so as to cooperatively receive the clamp arm 21 when in workpiece clamping position.

One form of linkage, sometimes referred to as linkage means, is illustrated in FIG. 1 as including a pair of links 65 at their one ends pivotally connected by pivot pin 67 to the clamp arm 21 intermediate its ends adjacent the pivot bolt 23. The other ends of said links are pivotally connected to the front pivot slide pin 55, which further functions to slidably support rod end 49.

Reciprocal movements of rod end 49 under the control of the cylinder assembly and piston rod 47 functioning through the linkage 65 is adapted to move the clamp arm 21 from the dash line retracted position shown in FIG. 1 to the solid line workpiece securing position. Protrusion block 57 and its stop 60 operatively engaging prestop 59 and limit forward movement of rod end 49.

As shown in FIG. 1, the second spacer 29 may be replaced by a tang mounting block 69 having bifurcations 71 with transverse fasteners 73 provided an auxiliary support for cylinder assembly 33.

MODIFIED CLAMP

Figure 4:
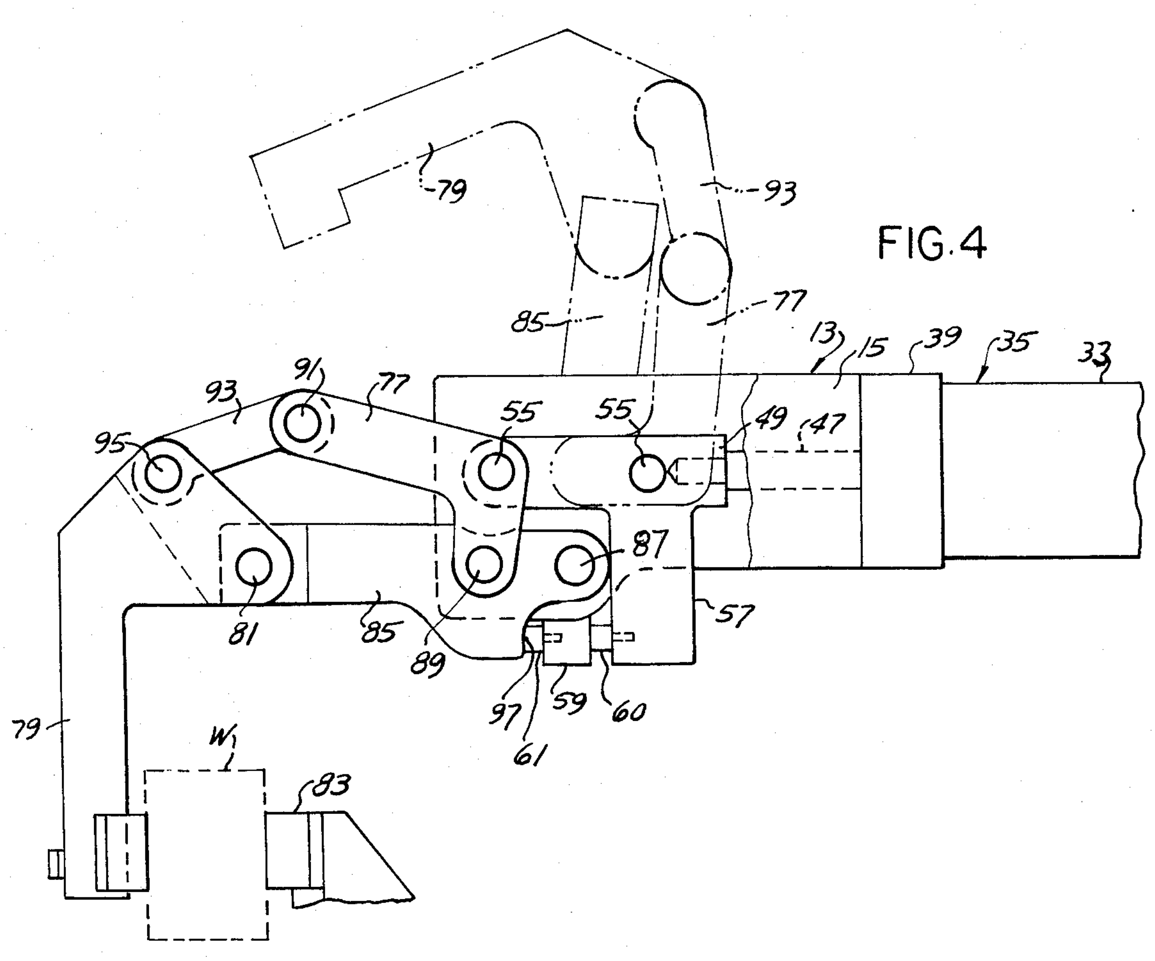
FIG. 4 is a schematic side elevational view of the power clamp shown in FIG. 1 from its opposite side illustrative of a modification in the linkage connecting the clamp arm with the rod end.

The linkage 65 having a pair of straight links in FIG. 1 may be modified by the contilever extension link 77 in the schematic illustration, FIG. 4. This is an improved construction.

By the use of a cantilever extension link 77, there is provided increased versatility to the clamp because such a link is pivotally mounted upon the rod end and longitudinally movable therewith. Link 77 is adapted to connect certain additional linkage 85 pivotally mounted at 87 upon the side plates 15 to provide for a compound pivotal movement of the clamp arm 79 with respect to the workpiece W and the workpiece support 83 fragmentarily shown in FIG. 4.

The construction of the cylinder assembly and clamp body side plates and rod end is substantially the same as shown with respect to FIG. 1. However, additional functions can be achieved by replacing the links 65 of FIG. 1 with the cantilever extension links 77, one of which is shown in FIG. 4, arranged upon opposite sides of the forward end of rod end 49. The extension links 77 intermediate their ends are pivotally mounted upon the front pivot slide pin 55.

Clamp arm 79 is in a substantially vertical position when retainingly engaging workpiece W relative to workpiece support 83. On retraction of the rod end 49, said clamp arm will assume the dash line position shown in FIG. 4.

The clamp arm 79 at one end is pivotally mounted by pivot pin 81 upon the forward end of the arm support 85, which is substantially horizontal in FIG. 4. The arm support at its other end is pivotally mounted by pivot pin 87 upon the side plates 15 of body 13 so that the arm support 85 is adapted to pivot on reciprocal movements with rod end 49.

The arm support 85 intermediate its ends is pivotally connected by the pivot pin 89 to one end of the extension link 77. Link 93 is pivotally interconnected with clamp arm 79 and the extension link. One end of link 93 is pivotally connected by the pivot pin 91 to one end of the extension link 77, and at its other end is pivotally connected by pivot pin 95 to an intermediate portion of clamp arm 79.

The protrusion block 57, FIG. 4, supports the stop 60, which at its outer end is adapted for operative retaining engagement with prestop 59. Surface 97 upon arm support 85 engages stop 61 on prestop 59 and limits pivotal movement of the support arm 85 to the horizontal position shown. This can be varied depending upon the clamping requirements and location of the workpiece W.

Figure 5:
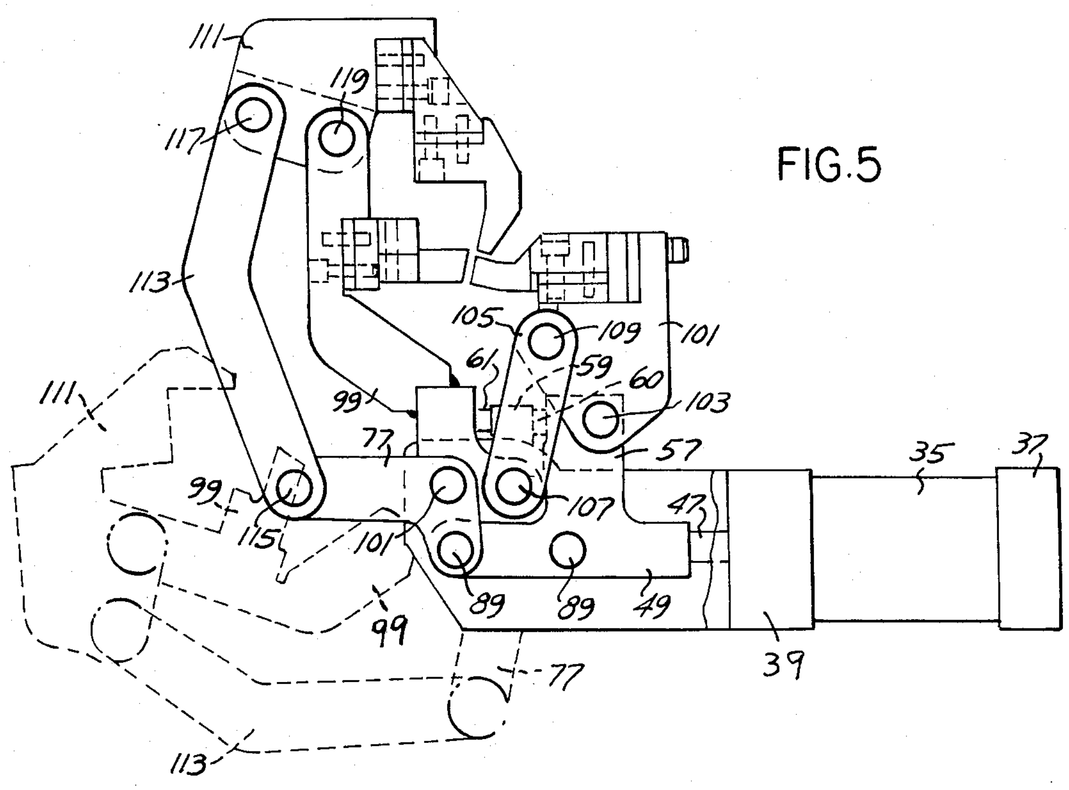
FIG. 5 is a schematic side elevational view of a further modification of the linkage illustrating its versatility in interconnecting the reciprocal rod end with two or more clamp arms.

With the provision of the cantilever extension link 77, the user of the power clamp assembly provides such additional linkage as may be required for supporting one, two or three clamp arms for controlled movements with respect to a workpiece as in FIGS. 4 and 5.

Examples of the use to which modified link styles may be employed or engineered by different customers to fit particular applications as shown in FIGS. 4 and 5.

MODIFIED CLAMP

In FIG. 5 the clamp is reversed, with the protrusion block 57 extending upwardly, and is adapted for reciprocal movements under the control of piston rod 47.

A more involved linkage is provided here involving a plurality of clamp arms wherein reciprocal movements of the rod end 49 using such linkage is adapted to rotate the respective clamp arms 99, 101 and 111 with respect to a workpiece interposed therebetween, but not shown in FIG. 5.

In this illustration irregularly regularly shaped clamp arm 99, referred to as clamp arm 1, FIG. 5, is pivotally connected by the pivot pin 101 to an intermediate portion of the extension link 77. Said extension link is pivotally connected at one end by the pivot pin 89 to the forward end of rod end 49.

Link or clamp arm assembly 101 is arranged above the protrusion block 57 referred to as clamp arm 2 utilizing pivot pin 103. The linkage for controlling the clamp arms further includes link 105 pivotally connected by pivot pin 107 to one end of clamp arm 99, and at its opposite end is pivotally connected by pivot pin 109 to clamp arm 101.

Clamp arm 111, sometimes referred to as clamp arm number 3, is pivotally connected to link 113 by pivot pin 117. Said link at its other end is connected to the forward end of extension link 77 by the transverse pivot pin 115.

Clamp arm assembly 111 is furthermore pivotally connected to the end of first clamp arm as by the transverse pivot pin 119.

Thus the three clamp arms 99, 101 and 111 utilize the special linkage above defined. Forward movement of rod end 49 moves the respective linkage parts and clamp arms to the solid line positions shown in FIG. 5. When the rod end 49 is retracted, the linkage assembly including the three clamp arms is designated by the dash ines shown in FIG. 5.

By replacing the straight links 65 of FIG. 1 with the cantilever extension type of link 77, shown for illustration in FIGS. 4 and 5, various types of additional linkages may be adapted for connection to the rod end and to the clamp body in order to provide for the compound pivotal movements of the respective three clamp arms shown in FIG. 5, as well as the compound movement defined for the single clamp arm 79 shown in FIG. 4.

The pre-stop 59-61 spans and is secured to the body side plates. As shown in FIG. 5 said pre-stop as in registry with protrusion block 57 and is adapted for limiting clamp movement of clamp arm 99. This also limits the movements of clamp arms 101 and 111.

The illustrations in FIGS. 4 and 5 indicate the versatility to which the present power clamp can be adapted by the use of the present cantilever extension link 77 shown in FIGS. 4 and 5. The rod end 49 serves as a mounting for the respective linkages including the extension link 77 for controlling positioning movements of the respective clamp arms and utilizing the rod end protrusion block 57 which is common to FIGS. 1, 4 and 5.

Having described my invention, reference should now be had to the following claims:

I claim:

1. In a fluid operated clamp for securing a workpiece relative to a workpiece support, including a cylinder having a reciprocal piston and connected piston rod projecting from said cylinder; a hollow body axially aligned with and connected to said cylinder and mounted upon a first support; said body being open at its top, bottom and front and including a pair of opposed spaced side plates with their one ends outturned and secured to said cylinder; said piston rod extending into said body between said side plates; a pivot bolt extending between forward portions of said side plates and secured thereto; a clamp arm at one end pivotally mounted upon said pivot bolt and in one position adapted to retainingly engage a workpiece relative to said workpiece support; and a pair of links at their one ends bearing against opposite sides of said clamp arm and pivotally connected thereto;

the improvement comprising;

a series of vertically spaced pairs of longitudinally spaced mounting holes extending through said side plates adjacent their tops and bottoms;

some of said mounting holes selectively at said tops and bottoms being adapted for registry with said first support for selective longitudinal adjustment of said body relative to said first support;

aperture spacers interposed between said side plates; a plurality of pivot bolts extending through some of said side plate mounting holes and spacers interconnecting said side plates;

said side plates upon their interiors having a pair of opposed guide slots therein;

an elongated rod end between said side plates axially connected to said piston rod;

a pair of longitudinally spaced front and rear pivot slide pins supportably extending transversely through said rod end and at their ends slidably mounted within said side plate slots;

said pair of links at their outer ends being pivotally connected to said front slide pin;

an apertured protrusion block secured upon and extending transversely of said rod end between said side plates and outwardly thereof;

and a pre-stop spanning and secured to said side plates normally spaced from said protrusion block and spaced from and aligned with said clamp arm;

adapted for retaining engagement with said clamp arm and said protrusion block when moved to workpiece retaining position, said pre-stop limiting forward movement of said protrusion block and rod end.

2. In the fluid power operated clamp of claim 1, the mounting of said body upon said first support including an elongated upright riser extending between said side plates and having a series of longitudinal similarly spaced apertures corresponding to some of said side plate mount holes and receiving said pivot bolts whereby said body may be mounted in one of a plurality of longitudinal locations relative to said riser.

3. In the fluid power operated clamp of claim 2, said riser extending selectively into the top of said body, and said protrusion block extending from the bottom of said body.

4. In the fluid power operated clamp of claim 2, said riser extending selectively into the bottom of said body, said protrusion block extending from the top of said body.

5. In the fluid power operated clamp for securing a workpiece relative to a workpiece support, including a cylinder having a reciprocal piston and connected piston rod projecting from said cylinder; a hollow body axially aligned with and connected to said cylinder and mounted upon a first support; said housing being open at its top, bottom and front and including a pair of opposed spaced side plates with their one ends outturned and secured to said cylinder; said piston rod extending into said body between said side plates; a clamp arm assembly and linkage pivotally mounted upon said body and in one position adapted to retainingly engage a workpiece relative to said workpiece support; and link means at their one ends pivotally connected to said clamp arm assembly and linkage;

the improvement comprising;

a series of vertically spaced pairs of longitudinally spaced transverse apertures extending through said side plates adjacent their tops and bottoms;

some of said mounting holes selectively at said tops and bottoms being adapted for registry with said first support for selective longitudinal adjustment of said body relative to said first support;

apertured spacers interposed between said side plates;

a plurality of pivot bolts extending through some of said side plate apertures and spacers interconnecting said side plates;

said side plates upon their interiors having a pair of opposed guide slots therein;

an elongated rod end between said side plates axially connected to said piston rod;

a pair of longitudinally spaced front and rear pivot slide pins supportably extending transversely through said rod end and at their ends slidably mounted within said side plate slots;

said link means pivotally connected to said front slide pin;

an apertured protrusion block secured to and extending transversely of said rod end between said side plates and outwardly thereof;

and a pre-stop mounted upon secured to, and spanning said side plates spaced from and aligned with said clamp arm assembly, adapted for retaining engagement with said clamp arm assembly when moved to workpiece retaining posision, said protrusion block being spaced from said pre-stop, and adapted for engagement therewith, limiting forward movement of said protrusion block and rod end.

6. In the fluid power operated clamp for securing a workpiece relative to a workpiece support, including a cylinder having a reciprocal piston and connected piston rod projecting from said cylinder; a hollow body axially aligned with and connected to said cylinder and mounted upon a first support; said body being open at its top, bottom and front and including a pair of opposed spaced side plates with their one ends outturned and secured to said cylinder; said piston rod extending into said body between said side plates; bolts extending between said side plates and secured thereto; a clamp arm pivotally mounted upon said body;

said side plates upon their interiors having a pair of opposed guide slots;

the improvement comprising;

an elongated rod end between said side plates axially connected to said piston rod;

a pair of longitudinally spaced pivot slide pins supportably extending transversely through said rod end and at their ends slidably mounted within said side plate slots;

a pair of cantilever extension links on opposite sides of said rod end intermediate their ends pivotally mounted thereon and reciprocally movable with said rod end;

a protrusion block upon and extending transversely of said rod end between side plates and outwardly thereof;

an arm support at one end pivotally mounted upon said body and intermediate its ends pivotally connected to one end of said extension links;

said clamp arm being pivotally mounted at one end upon the other end of said arm support;

and a link interposed between and at its ends pivotally connected to the other end of said extension links and to said clamp arm.

7. In the fluid power operated clamp of claim 5, said link means including a pair of cantilever extension links on opposite sides of said rod end and intermediate their ends pivotally mounted upon said front pivot slide pin and reciprocally movable with said rod end;

said clamp arm assembly and linkage including an arm support at one end pivotally mounted upon said body and intermediate its ends pivotally connected to one end of said extension links;

said clamp arm being pivotally mounted at one end upon the other end of said arm support;

and a link interposed between and at its ends pivotally connected to the other end of said extension links and to said clamp arm.

8. In the power operated clamp of claim 5, said link means including a pair of cantilever extension links pivotally mounted upon said front pivot slide pin;

said clamp arm assembly and linkage including a first clamp arm pivotally mounted intermediate its ends and upon an intermediate portion of said extension links;

a second clamp arm pivotally mounted at one end upon said protrusion block;

a link interposed between and pivotally connected at its opposite ends to said first and second clamp arms;

a third clamp arm pivotally mounted upon said first clamp arm;

and a link at its opposite ends pivotally connected to one end of said extension links and to said third clamp arm;

whereby upon forward movement of said rod end each of said clamp arms rotates into clamping engagment with a workpiece.

9. In a fluid power operated clamp for securing a workpiece relative to a workpiece support, including a cylinder having a reciprocal piston and connected piston rod projecting from said cylinder; a hollow body axially aligned with and connected to said cylinder and mounted upon a first support; said body including a pair of opposed spaced apart side plates secured to said cylinder; a pivot bolt extending between and mounted on forward portions of said side plates; a clamp arm at one end pivotally mounted upon said pivot bolt and in one position adapted to retainingly engage a workpiece relative to said workpiece support; and link means at their one ends bearing against opposite sides of said clamp arm and pivotally connected thereto;

the improvement comprising;

said side plates upon their interiors having a first opposed guide means;

an elongated rod end between said side plates operably coupled to said piston rod;

second guide means mounted upon said rod end transversely thereof, movably and supportably mounted within said side plate first guide means;

said link means at their other ends being pivotally connected to said rod end;

a normally retracted protrusion block operably coupled to and movable with said rod end;

and a pre-stop secured to said clamp and normally spaced from said protrusion block and spaced from and aligned with said clamp arm;

said pre-stop adapted adapted for retaining engagement with said clamp arm and with said protrusion block when said clamp arm is pivoted into workpiece retaining position.

10. In a fluid power operated clamp for securing a workpiece relative to a workpiece support, including a cylinder having a reciprocal piston and connected piston rod projecting from said cylinder; a hollow body axially aligned with and connected to said cylinder and mounted upon a first support; said body being open at its top, bottom and front and including a pair of opposed spaced side plates secured to said cylinder; said piston rod extending into said body between said side plates; a pivot bolt extending between forward portions of said side plates and secured thereto; a clamp arm at one end pivotally mounted upon said pivot bolt and in one position adapted to retainingly engage a workpiece relative to said workpiece support; and a pair of links at their one ends bearing against opposite sides of said clamp arm and pivotally connected thereto;

the improvement comprising;

means for securing the side plates together and for mounting them upon the first support;

said side plates upon their interiors having a pair of opposed guide slots therein;

an elongated rod end between said side plates axially connected to said piston rod;

guide means mounted upon said rod end transversely thereof movably and supportably mounted within said side plate slots;

said pair of links at their other ends being pivotally connected to said rod end;

a normally retracted protrusion block mounted upon and extending transversely of said rod end between said side plates and outwardly thereof;

and a pre-stop spanning and secured to said side plates normally spaced from said protrusion block and spaced from and aligned with said clamp arm;

adapted for retaining engagement with said clamp arm and with said protrusion block when side clamp arm is pivoted to workpiece retaining position.

11. In the clamp of claim 9, the improvement further comprising;

a series of vertically spaced pairs of longitudinally spaced mounting holes extending through said side plates adjacent their tops and bottoms; apertured spacers interposed between said side plates; a plurality of pivot bolts extending through some of said side plate mounting holes and spacers interconnecting said side plates, some of said mounting holes selectively at said tops and bottoms being adapted for registry with said first support for selective longitudinal adjustment of said body relative to said first support.

* * * * *